US010358895B2

(12) United States Patent
Cobb

(10) Patent No.: US 10,358,895 B2
(45) Date of Patent: Jul. 23, 2019

(54) REUSABLE PRE-ENERGIZED BACKUP RING

(71) Applicant: HALLIBURTON ENERGY SERVICES, INC., Houston, TX (US)

(72) Inventor: James H. Cobb, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 203 days.

(21) Appl. No.: 15/525,254

(22) PCT Filed: Dec. 30, 2014

(86) PCT No.: PCT/US2014/072779
§ 371 (c)(1),
(2) Date: May 8, 2017

(87) PCT Pub. No.: WO2016/108853
PCT Pub. Date: Jul. 7, 2016

(65) Prior Publication Data
US 2018/0283139 A1 Oct. 4, 2018

(51) Int. Cl.
*E21B 41/00* (2006.01)
*E21B 33/12* (2006.01)
(Continued)

(52) U.S. Cl.
CPC .......... *E21B 41/00* (2013.01); *E21B 33/1208* (2013.01); *E21B 47/011* (2013.01); *F16J 15/166* (2013.01); *F16J 15/3272* (2013.01)

(58) Field of Classification Search
CPC .... E21B 41/00; E21B 33/1208; E21B 47/011; F16J 15/166; F16J 15/3272; F16J 15/067;
(Continued)

(56) References Cited

U.S. PATENT DOCUMENTS 4,027,816 A  6/1977  Slator et al.
4,493,380 A  1/1985  Townson
(Continued)

FOREIGN PATENT DOCUMENTS

CA    2371537 A1    8/2002
RU    95121518 A    10/1997
(Continued)

OTHER PUBLICATIONS

International Search Report and Written Opinion; PCT Application No. PCT/US2014/072779; dated Oct. 16, 2015.
(Continued)

*Primary Examiner* — Wei Wang
(74) *Attorney, Agent, or Firm* — Polsinelli PC

(57) ABSTRACT

A resilient backup ring is shaped for insertion with a sealing ring into an annular groove in at least one of two close fitting members in order to limit extrusion of the sealing ring. The backup ring is split by a cut permitting the backup ring to be contracted in diameter for seating of the backup ring in the annular groove. The cut defines respective shapes in two ends of the backup ring that engage each other for latching the backup ring in a contracted diameter configuration. At least one of the two ends has a cavity for receiving a tool for applying force to move the two ends apart and unlatch the backup ring from the contracted diameter configuration and expand the diameter of the backup ring for removal of the sealing ring from the annular groove.

18 Claims, 7 Drawing Sheets

(51) Int. Cl.
*E21B 47/01* (2012.01)
*F16J 15/16* (2006.01)
*F16J 15/3272* (2016.01)

(58) Field of Classification Search
CPC ... F16J 15/10; F16J 15/00; F16J 15/26; B65D 53/00; B65D 53/02
See application file for complete search history.

(56) References Cited

U.S. PATENT DOCUMENTS

| | | |
|---|---|---|
| 5,131,666 A | 7/1992 | Hutchens |
| 5,470,114 A | 11/1995 | Umney et al. |
| 6,056,294 A | 5/2000 | Smith |
| 6,173,968 B1 | 1/2001 | Nelson et al. |
| 6,454,273 B1 | 9/2002 | Kashima et al. |
| 6,758,478 B1 | 7/2004 | Moreno |
| 7,341,258 B2 | 3/2008 | Holt et al. |
| 7,434,849 B2 | 10/2008 | Takeuchi et al. |
| 7,828,301 B2 | 11/2010 | Briscoe et al. |
| 8,262,091 B2 | 9/2012 | Lewis |
| 8,794,638 B2 | 8/2014 | Tuckness et al. |
| 8,807,572 B2 | 8/2014 | McCarthy |
| 2008/0157486 A1 | 7/2008 | Kuzawa et al. |
| 2009/0121442 A1 | 5/2009 | Uozumi et al. |
| 2010/0320217 A1 | 12/2010 | Okawachi et al. |
| 2012/0038115 A1 | 2/2012 | Herrera et al. |
| 2013/0026714 A1 | 1/2013 | Maeda et al. |
| 2013/0180733 A1 | 7/2013 | Bradshaw et al. |
| 2013/0247624 A1 | 9/2013 | DeWalch et al. |
| 2013/0313769 A1 | 11/2013 | Sato |
| 2014/0070494 A1 | 3/2014 | Winkelmann et al. |

FOREIGN PATENT DOCUMENTS

| | | |
|---|---|---|
| RU | 97162 U1 | 8/2010 |
| RU | 2494219 C1 | 9/2013 |

OTHER PUBLICATIONS

Russian Search Report; Russian Application No. 2017117639; dated Mar. 26, 2018.

English abstract of RU97162; retrieved from www.espacenet.com on Apr. 25, 2018.

English abstract of RU2494219; retrieved from www.espacenet.com on Apr. 25, 2018.

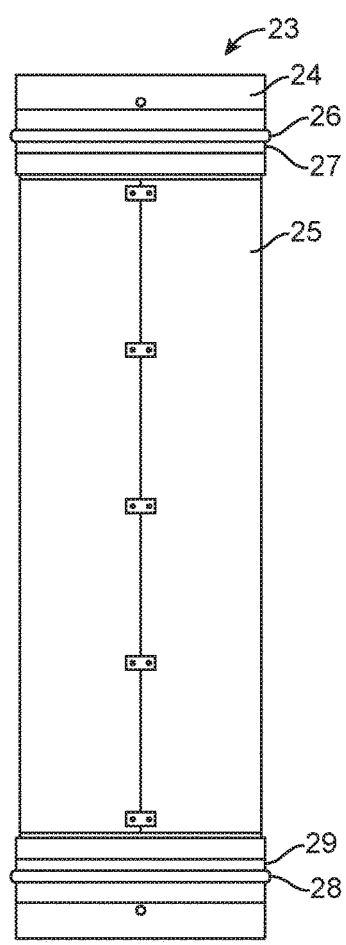
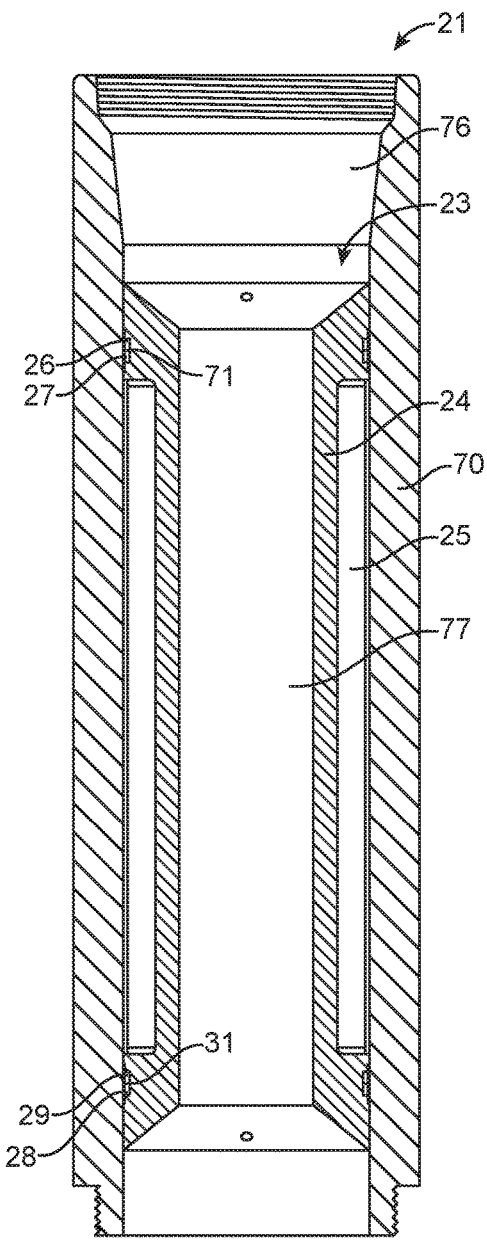
FIG. 2
FIG. 3

REUSABLE PRE-ENERGIZED BACKUP RING

CROSS-REFERENCE TO RELATED APPLICATIONS

This application is a national stage entry of PCT/US2014/072779 filed Dec. 30, 2014, said application is expressly incorporated herein in its entirety.

FIELD

The subject matter herein generally relates to a backup ring for reinforcing a sealing ring such as an O-ring and preventing extrusion of the sealing ring when the sealing ring is subject to fluid or air pressure.

BACKGROUND

O-rings are often used for sealing an annular gap between two close-fitting members. Typically the O-ring is seated in an annular groove formed in one of the two close-fitting members. The close-fitting members are often nested tubular members carrying fluid or air under pressure, and in this case the annular groove is most often formed in an inner one of the nested tubular members.

It is often desirable for the O-ring to be made of an elastomeric material in order to seal an annular gap. However, elastomeric materials that are sufficiently elastic and compliant to accommodate large variations in gap width are typically subject to extrusion under high pressure fluid or air. Therefore this extrusion will limit the fluid pressure that can be contained by the O-ring. When it is desired for an O-ring to contain a high pressure fluid and accommodate a significant gap, a backup ring is often used in conjunction with the O-ring to reduce extrusion of the O-ring into the gap and therefore increase the maximum fluid pressure that can be contained by the O-ring.

In use, the backup ring is placed on the low-pressure side of the O-ring, in the same annular groove holding the O-ring. The backup ring is made of a material that is resilient and less compliant but more durable than the O-ring. For example, the O-ring is made of soft rubber, and the backup ring is made of resilient metal. Thus, the backup ring can reduce or close the gap without necessarily sealing the gap, in order to limit extrusion of the O-ring into the gap, so that the O-ring will seal the gap and contain a higher fluid pressure than would be possible without the backup ring.

BRIEF DESCRIPTION OF THE DRAWINGS

FIG. 2 is a diagram showing a tool insert carrying sealing rings and backup rings;

FIG. 3 is a lateral cross-section of the tool insert of FIG. 2 inserted into a drill collar;

DETAILED DESCRIPTION

Figure 1:
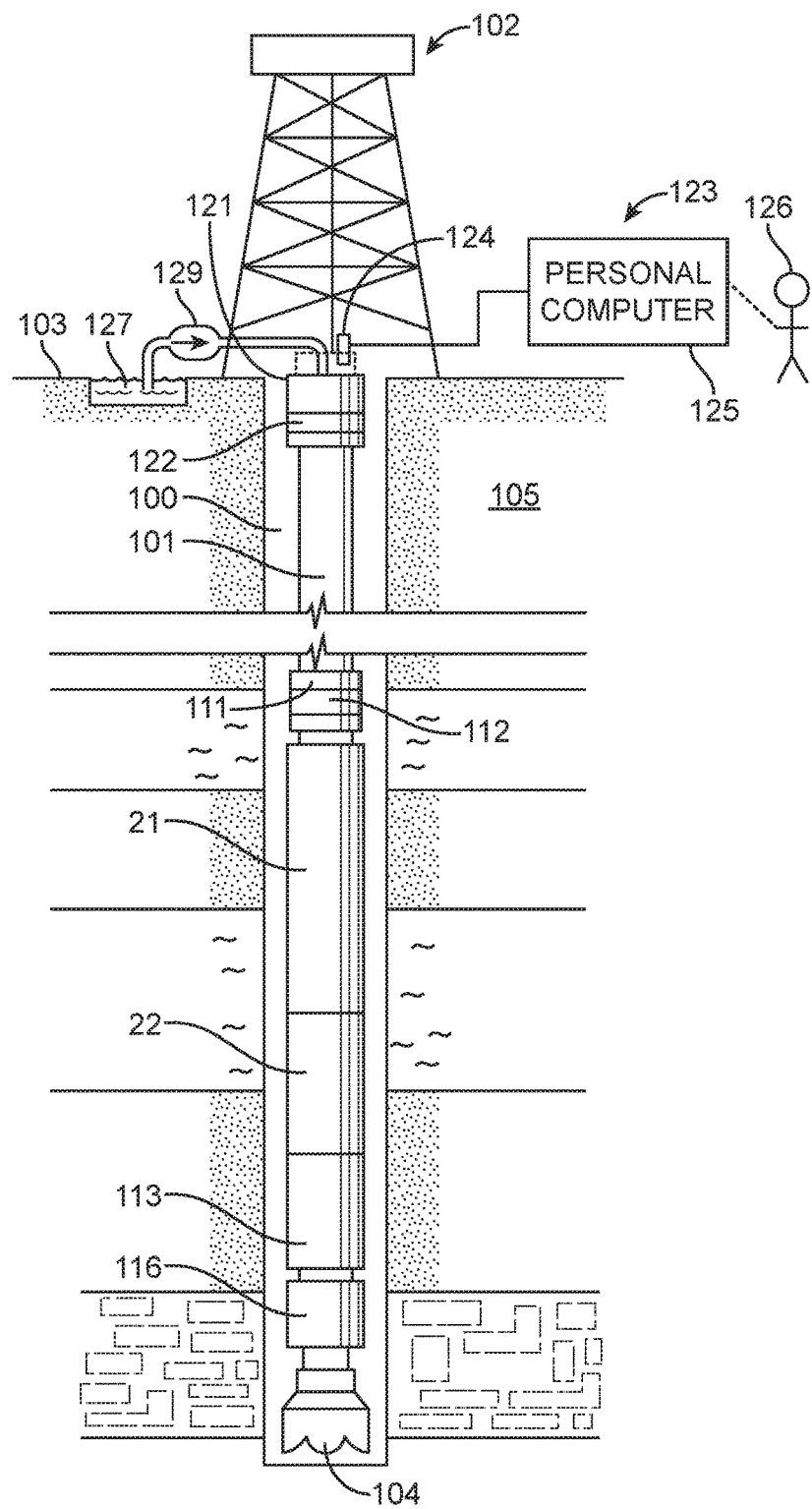
FIG. 1 is a diagram of an example system for drilling a well bore.
Figure 4:
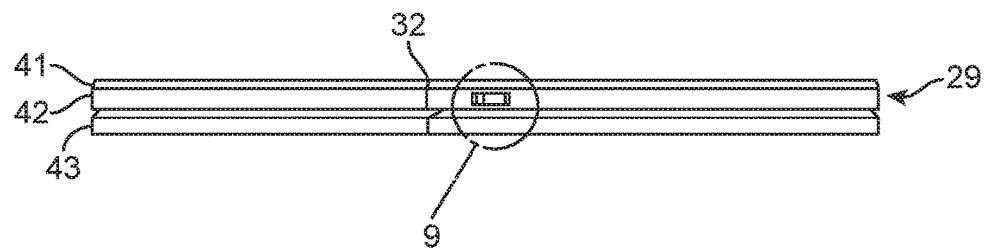
FIG. 4 is a top view of a backup ring.
Figure 5:
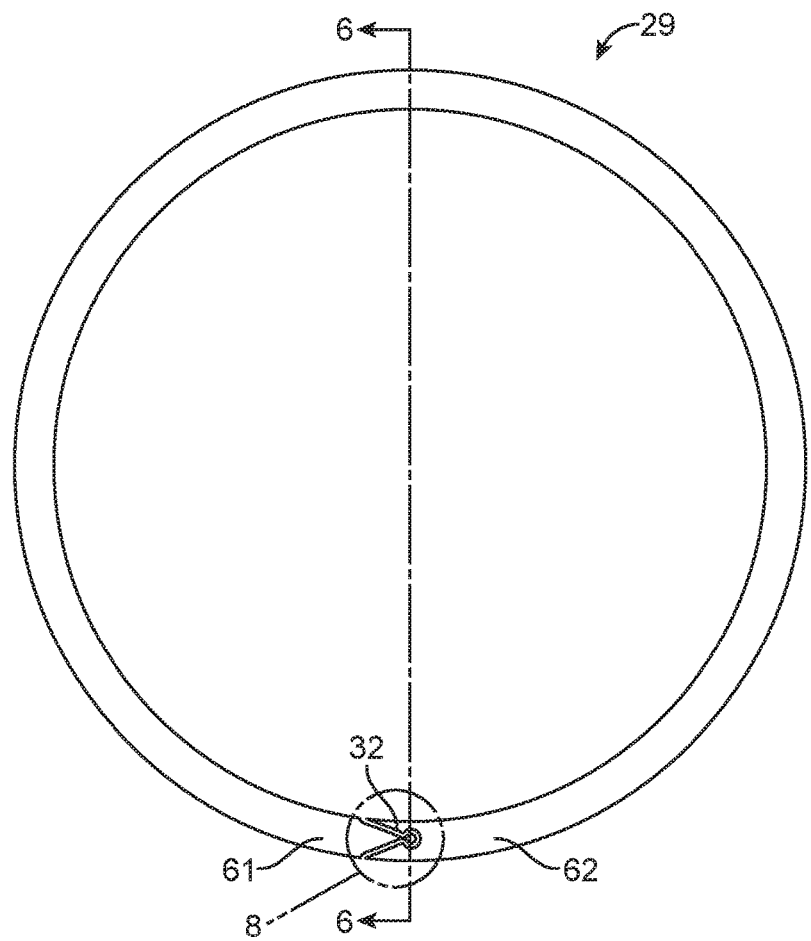
FIG. 5 is a front view of the backup ring.
Figure 6:
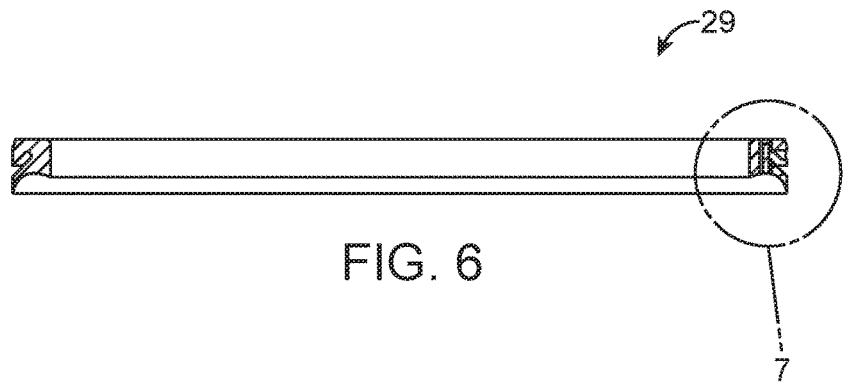
FIG. 6 is a cross-section of the backup ring along line 6-6 in FIG. 5.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object.

The present disclosure is described in relation to a backup ring used with a sealing ring for sealing a joint between an insert or bulkhead inside a drill collar of the kind that is lowered into a well bore. However, the backup ring can be used in connection with a sealing ring for sealing an annular gap between various kinds of close fitting members such as a cap fitted to a pipe, or a piston fitted to a cylinder.

Referring now to FIG. 1, a system for drilling a well bore 100 includes a drill string 101 supported by a rig 102 at the surface 103. A drill bit 104 at the end of the drill string 101 creates the well bore 100 through the surrounding formation 105, which may also include formation boundaries. A pump 129 pumps drilling mud from a pool 127 down through the drill string 101 and up the annulus around the drill string 101 to cool the drill bit 104 and remove cuttings from the well bore 100. Pressure from the pump 129 drives a mud motor 113 that rotates the drill bit 104.

A sensor sub-unit 111 is situated above the drill bit 104. The sensor sub-unit 111 carries an apparatus 112 for transmitting, receiving, and processing signals passing along drill string 101 to and from the surface 103. For illustrative purposes, the sensor sub-unit 111 is shown in FIG. 1 positioned above the mud motor 113, and additional sensor sub-units 21, 22 are disposed between the sensor sub-unit 111 and the mud motor 113. A rotary steerable sub-unit 116 is positioned below the mud motor 113. The sub-units 21, 22, 116 each have acoustic apparatus to communicate with the sensor sub-unit 111 in order to relay information to the surface 103. Communication between the sub-units 111, 21, 22, 116 may be accomplished by use of a short hop acoustic telemetry system.

At the surface 103, supported by the drill string 101, a surface sub-unit 121 carries acoustic apparatus 122. The surface sub-unit 121 may be supported also by the surface rig 102. Signals received at the acoustic apparatus 122 may be processed within the acoustic apparatus 122 or sent to a surface installation 123 for processing.

As shown in FIG. 1, the surface installation 123 includes a transceiver 124 for communicating with the surface sub-unit 121, and a personal computer 125 coupled to the transceiver 124 for processing the signals from the sensor sub-unit 121 and reporting results to a drilling operator 126.

The sealing of closely fitting down-hole components such as tool inserts in the drill collars 21, 22 is especially troublesome because a down-hole leak may cause a failure of a tool insert, and this failure may interrupt drilling operations. In this case, a long drill string 101 would be raised to the surface and disassembled in order to replace the drill collar and failed tool insert with a spare down-hole tool, and then the drill string would be reassembled and lowered into the well bore 100 to resume drilling operations. The drill collar and tool insert having the failure would be sent to a repair and maintenance shop for repair of the tool insert and replacement of sealing rings sealing the tool insert in the drill collar.

As shown in FIGS. 2 and 3, a cylindrical and tubular tool insert 23 of FIG. 2 is configured for insertion into a drill collar 70 to produce the down-hole tool 21 of FIG. 3. The tool insert 23 is comprised of a tubular steel core 24 having a mid-section of reduced thickness to accommodate circuit boards or electronics 25 fitted around the mid-section. The upper and lower portions of the tubular steel core 24 have outer diameters closely fitted to the inner diameter of the drill collar 70. The upper portion of the tubular steel core 24 has an annular groove 71 and a sealing ring 26 and a backup ring 27 fitted into the annular groove 71. The lower portion of the tubular steel core 24 has an annular groove 31 and a sealing ring 28 and a backup ring 29 fitted into the annular groove 31. The sealing rings 26, 28 seal an annular region between the drill collar 70 and the tubular steel core 24. The circuit boards or electronics 25 fill this annular region.

The drill collar 21 is a steel tubular member having an internal bore 76 for insertion of electromechanical inserts which will then convey the drilling fluid under pressure from the surface down to the bit (104 in FIG. 1) at the lower end of the drill string. The tubular steel core 24 of tool insert 23 also has an internal bore 77 for conveying this drilling fluid. The sealing rings 26, 28 seal the circuit boards or electronics 25 from the pressure of this drilling fluid, and therefore the sealing rings 26, 28 and the backup rings 27, 29 must withstand this pressure. The backup rings 27, 29 prevent extrusion of the sealing rings 26, 28 into any gaps between the internal surface of the drill collar 70 and the close fitting external surfaces of the upper and lower portions of the tubular steel core 24. For example, the sealing rings 26, 28 are elastomeric O-rings made of rubber, and the backup rings 27, 29 are made of ICONEL brand of nickel-chromium alloy number 718. This particular alloy is very suitable for the backup rings 27, 29 because this alloy is strong, resilient, corrosion resistant, and non-magnetic. Other resilient, non-magnetic metals or metal alloys may also be suitably employed.

As further shown in FIG. 3, the sealing ring 26 and backup ring 27 are disposed in an annular groove 71 cut in the outer periphery of the upper portion of the tubular steel core 24. The sealing ring 28 and the backup ring 29 are disposed in an annular groove 31 cut in the outer periphery of the lower portion of the tubular steel core 24. Each of the annular grooves 71, 31 has a rectangular lateral cross-section. In each annular groove 71, 31, the backup ring 27, 29 is disposed on a low-pressure side of the neighboring O-ring 26, 28. For example, the O-ring 28 contacts and is held against a concave annular surface (30 in FIG. 7) of the backup ring 29 when the backup ring is fitted over the annular groove 31 and seated into the annular groove once the O-ring is installed The backup ring 29 is a split ring constructed so that it is re-usable when the O-ring 28 is replaced. There is a cut 32 through the backup ring 29 to permit the backup ring to be expanded so that its diameter increases for fitting over the annular groove 31, and to permit the backup ring to be contracted so that its diameter decreases for seating of the backup ring into the annular groove. For example, the cut 32 is parallel to the axis of the backup ring, and the cut is made using a wire electro-discharge machine (EDM) or a laser. If the backup ring 29 is made of electrically conductive material, such as metal, then a wire EDM may be used for cutting the metal. Wire EDM may provide a cut 32 having a width as small as four thousandths of an inch. If the backup ring 29 is made of a non-conductive material, such as fiberglass or composite, then a laser may be used for making the cut 32.

Figure 8:
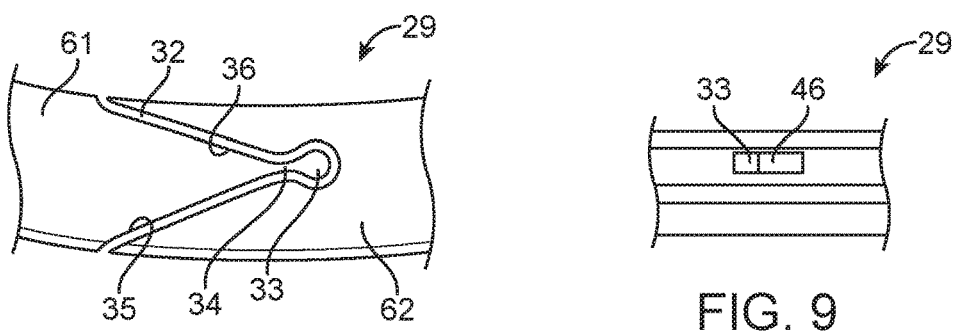
FIG. 8 is a detail of region 8 in FIG. 5.
Figure 9:
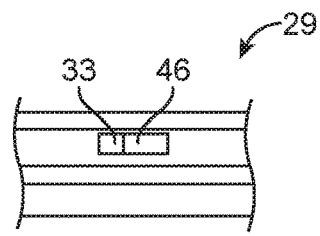
FIG. 9 is a detail of region 9 in FIG. 4.
Figure 10:
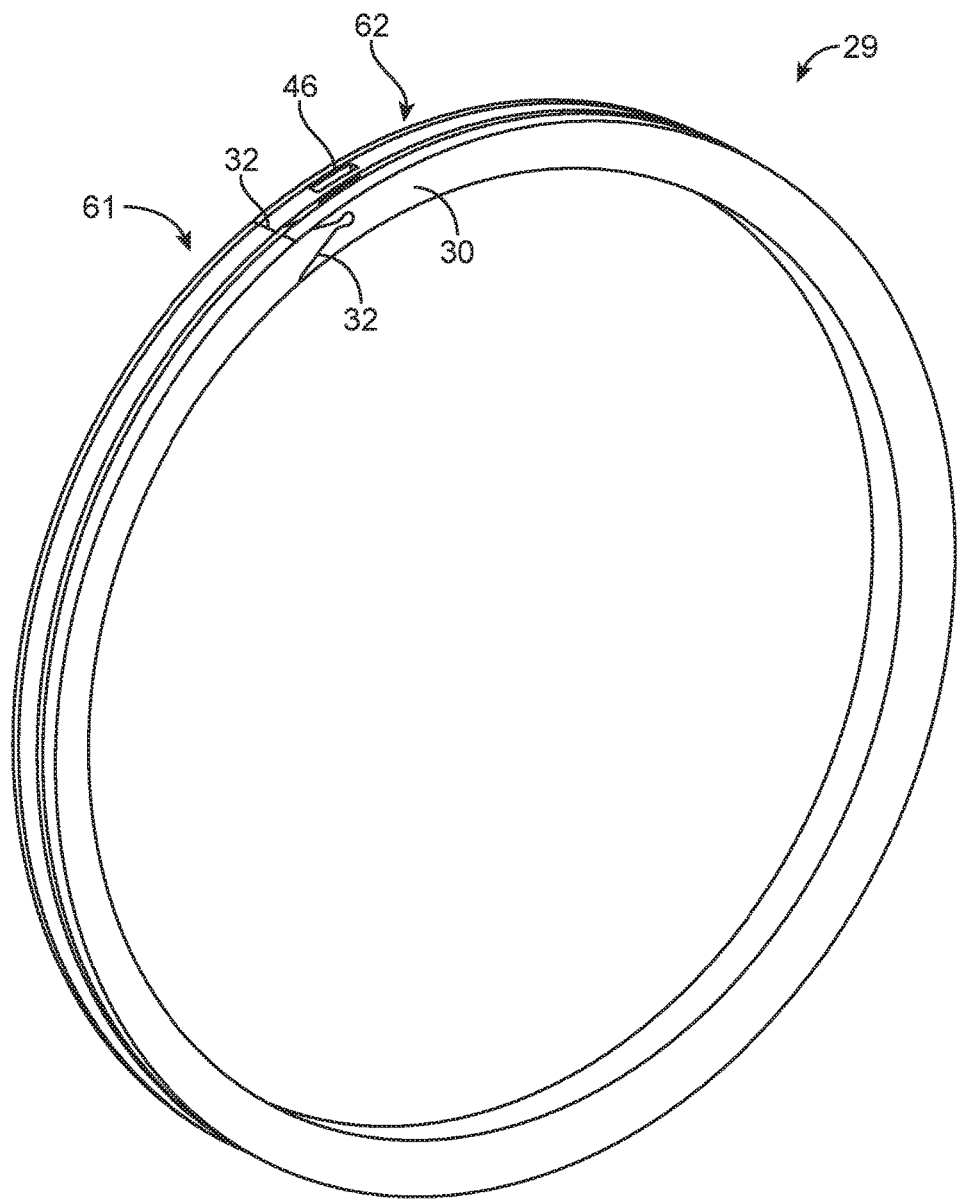
FIG. 10 is another view of the backup ring.

The cut 32 defines respective shapes in two ends 61, 62 of the backup ring 29, and the two ends 61, 62 engage each other for latching the backup ring in a contracted diameter configuration. For example, the cut 32 is shaped so that the backup ring 29 snaps into place when it seats into the annular groove 31 and also seals itself due to pressure from the O-ring. As seen in FIG. 8, the cut 32 forms a head 33, a neck 34 narrower than the head 33, and inclined shoulders 35, 36 extending from the neck 34 and forming a V-shaped body having shoulders 35, 36 in the first end 61 of the backup ring 20. The cut 32 forms a complementary shape in the second end 62 of the backup ring 29.

Once the backup ring 29 snaps into place and is seated with the O-ring 28 in the annular groove 31, the backup ring 29 has an outer diameter that is slightly larger than the inner diameter of the drill collar 70. Thus, when the tool insert 23 has been inserted into the drill collar 70, the outer diameter of the backup ring 29 contacts slightly and is biased against the inner diameter of the drill collar 70. This bias force exists in the absence of pressure upon the O-ring 28 due to fluid in the bores 25, 26, and may also exist in the absence of pressure due to deformation and elasticity of the O-ring 28 itself.

For the case of the bias force existing due to the backup ring itself and not due to pressure from the O-ring, the backup ring 29 is said to be "pre-energized." In this case, when the backup ring 29 has been latched into the contracted diameter configuration, the backup ring can be squeezed to have a minimum contracted diameter, and then the backup ring will expand from this minimum contracted diameter in the absence of applied force upon the backup ring.

For example, in the configuration of FIG. 2, the backup ring 29 has been latched into the contracted diameter configuration but the backup ring has also expanded from a minimum contracted diameter. In this state the backup ring 29 can be fitted easily over the outer circumference of the lower portion of the steel tubular core 24 because the backup ring can contract somewhat to fit snugly within the groove 31, as shown in FIG. 3. Thus, in the configuration of FIG. 3, the backup ring 29 may have a contracted diameter that is slightly greater than the minimum contracted diameter and also have a self bias force helping to seat the outer periphery of the backup ring 29 against the inner circumference of the drill collar 70.

The backup ring 29 may have a pre-energized state immediately after the cut 32 has been made through the backup ring. In this case, once the cut has been completed, the backup ring 29 expands in diameter due to residual strain that existed in the backup ring 29 before the cut 32 was made. If the pre-energized condition would not exist immediately after the cut 32 has been made, then the backup ring 29 could be put into the pre-energized condition by applying force to the backup ring to expand the diameter of the backup ring slightly beyond its elastic limit. This could be done in connection with heat treatment of the backup ring 29 that would facilitate its expansion or would impart resiliency to the backup ring once the backup ring has been expanded.

Figure 7:
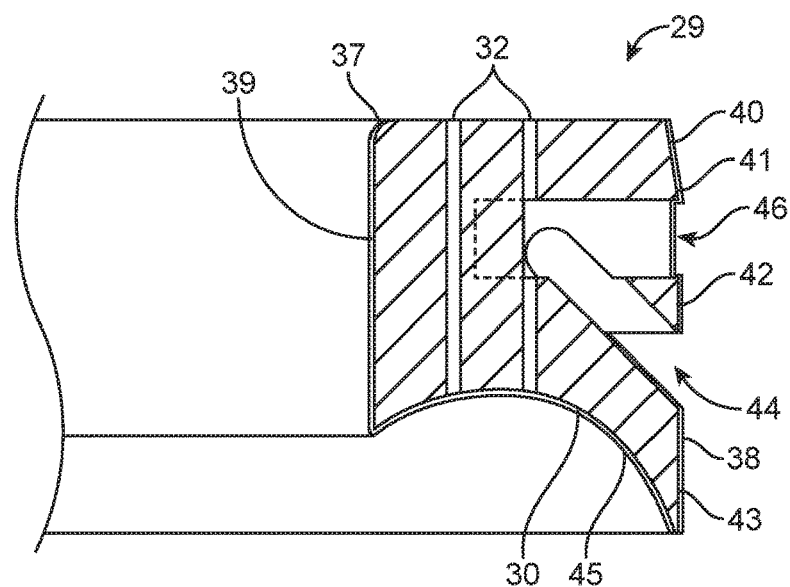
FIG. 7 is a detail of region 7 in FIG. 6.

As shown in FIG. 7, the backup ring 29 has an inner radial seating area 37 on its low pressure side to assist in ease of installation. Thus, the inner radial seating area 37 is on the inner circumferential surface of the backup ring 29 away from the concave annular surface 30. The outer periphery of the backup ring is formed with annular peripheral surfaces 41, 42, 43 shaped for contacting and seating against the inner periphery of the upper end 24 of the lower drill collar 22. An annular ramp 40 on the low pressure side concentrates pressure on the first annular peripheral seating surface 41. An annular inclined groove 44 is cut into the ring 29 forming a spring effect and increasing the resiliency of the ring at the second and third annular peripheral seating surfaces 42 and 43.

For example, the annular inclined groove 44 has a depth ending at the head 33, and the third annular peripheral seating surface 43 overhangs the concave surface 30 that contacts the O-ring 28. The annular inclined groove 44 enhances the ability of the third annular peripheral seating surface 43 to expand due to force from the O-ring 28 due to fluid pressure upon the O-ring or due to elastic deformation of the O-ring caused from temperature. Thus, the annular inclined groove 44 assists in opening and contacting to full seal bore diameters, and may also act as a self-locking mechanism that is self-adjusting to deviations in seating areas.

The outer seating surfaces of the backup ring 29 may have a coating 38 to prevent scratching of the sealing surfaces during installations and to promote seating of these surfaces. For example, the coating is polyether ether ketone (PEEK) or a PEEK derivative, or polytetrafluoroethylene (PTFE), and the thickness of the coating is in the range of two ten-thousandths to ten thousandths of an inch. The prevention of damage to the O-ring and the backup ring during installation is very desirable for wellbore drilling operations.

The inner mounting surface of the backup ring 29 may have a coating 39 for thermal isolation or for thermal conduction. The concave annular surface 30 may also have a coating 45 for thermal isolation or for thermal conduction. Thermal isolation would be desirable if the backup ring would encircle a heat source. In this case a ceramic coating would provide some thermal isolation. Thermal conduction would be desirable if the backup ring would encircle a heat sink. In this case a thermally conductive coating, such as copper or beryllium copper would enhance thermal conduction, for example to assist in cooling or delay of thermal set of the O-ring.

Figure 11:
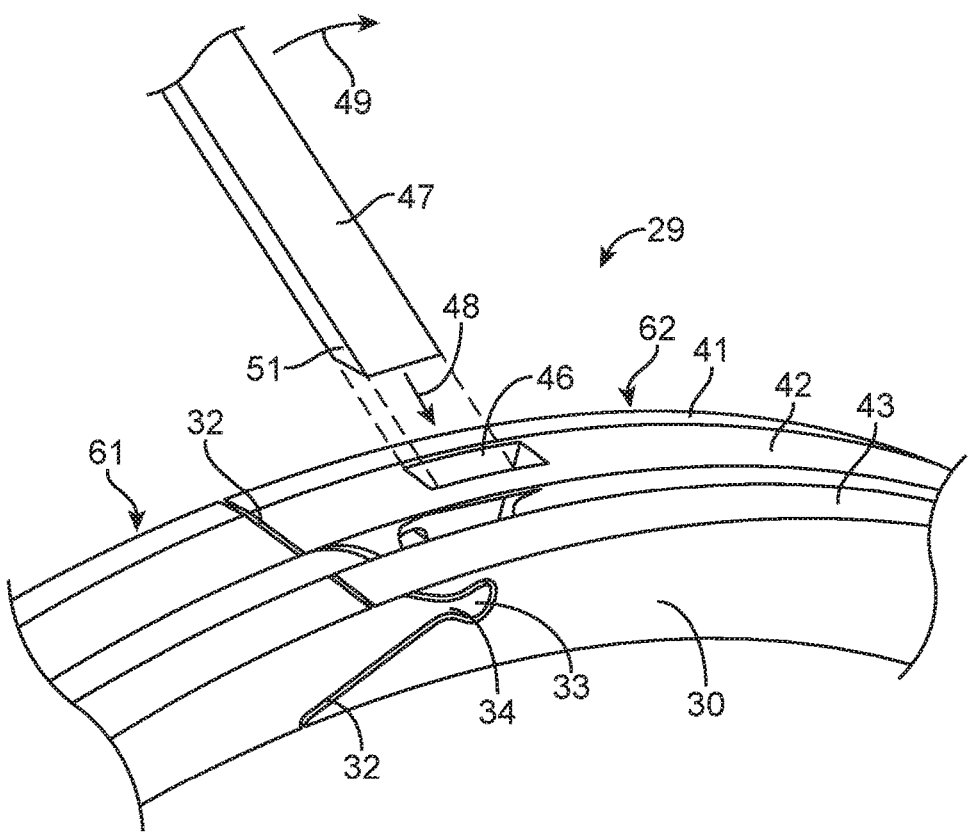
FIG. 11 shows a tool being used to open the backup ring.

As shown in FIGS. 4 and 7 to 11, a radial rectangular slot 46 extends about two-thirds through the backup ring 29 for insertion of a removal tool 47 shown in FIG. 11 along an inward radial direction 48. Once the removal tool 47 is fully inserted, it is cocked backward in a circumferential direction 49 so that a lower surface 51 of the removal tool butts against the head 33 to increase the diameter of the backup ring 29. This permits the backup ring 29 to be removed from the annular groove 31 in the lower end 23 of the upper drill collar without scratching the seating surfaces 41, 42, 43 on the backup ring 29. Moreover, the increase in radial width of the head 33 over the radial width of the neck 34 is only slightly greater than twice the radial width of the cut 32 so that the elastic limit of the material of the backup ring 29 is not exceeded when the inner diameter of the backup ring 29 is expanded to greater than the outer diameter of the groove 31 in the lower end 23 of the upper drill collar 21. Consequently, the backup ring 29 can be removed and re-inserted with a new O-ring any number of times without damage to the backup ring.

Figure 12:
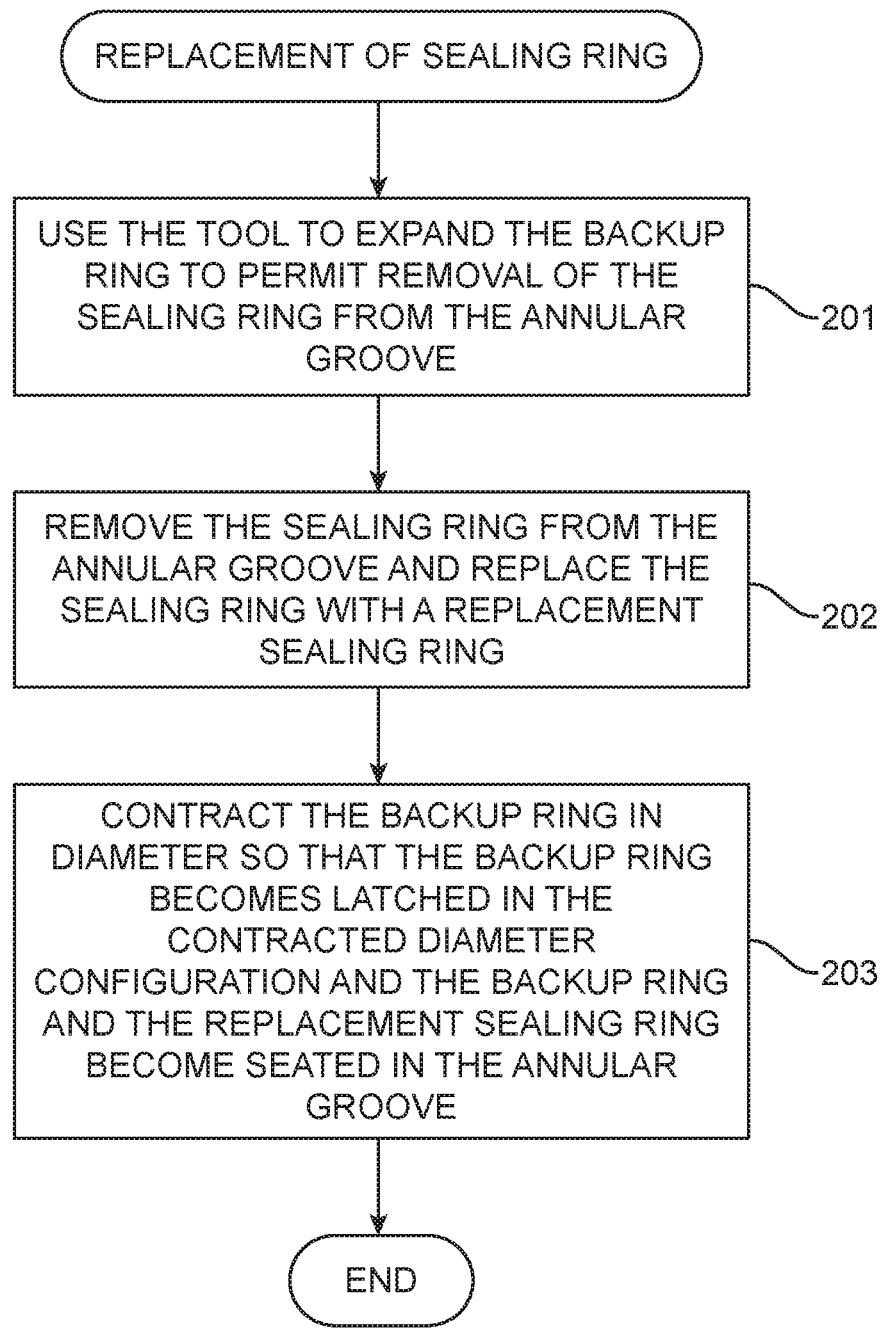
FIG. 12 shows a flowchart of operations for replacement of a sealing ring backed by the backup ring.

FIG. 12 shows an example of a method of replacement of a sealing ring in an assembly of the kind shown in FIG. 2. In this example the assembly includes the sealing ring (28 in FIG. 2) seated in an annular groove (29 in FIG. 3) next to a backup ring (29 in FIG. 2). The backup ring is split by a cut (32 in FIG. 8) permitting the backup ring to be contracted in diameter for seating of the backup ring and the sealing ring in the annular groove. The cut (32 in FIG. 8) defines respective shapes in two ends (61 and 62 in FIG. 8) of the backup ring that engage each other for latching the backup ring in a contracted diameter configuration. At least one of the two ends (62 in FIG. 11) has a cavity (46 in FIG. 11) for receiving a tool (47 in FIG. 11) for applying force to move the two ends apart and unlatch the backup ring from the contracted diameter configuration and expand the backup ring for removal of the sealing ring from the annular groove.

The method of FIG. 12 includes a first operation, in box 201 in FIG. 12, of using the tool to expand the backup ring to permit removal of the sealing ring from the annular groove. For example, expansion of the backup ring exposes a portion of the sealing ring. Then, in box 202, the sealing ring is removed from the annular groove and replaced with a replacement sealing ring. For example, the exposed portion of the sealing ring is grasped to pull the sealing ring out of the annular groove and separate the sealing ring from the backup ring. The exposed portion of the sealing ring could be grasped and removed with an O-ring removal tool. Then, in box 203, the backup ring is contracted in diameter so that the backup ring becomes latched in the contracted diameter configuration and the backup ring and the replacement sealing ring become seated in the annular groove. For example, the backup ring is contracted by hand, by grasping the backup ring with both hands to push the backup ring into the annular groove. If the backup ring were too large in diameter for the backup ring to be contracted by hand, then a tool could be used instead. For example, the tool could be similar to an oil filter wrench so that the tool would wrap around the backup ring and push the backup ring into the annular groove.

Numerous examples are provided herein to enhance understanding of the present disclosure. A specific set of examples are provided as follows.

In a first example, there is disclosed a resilient backup ring shaped for insertion with a sealing ring into an annular groove disposed in at least one of two close fitting members, the backup ring comprising a cut splitting the backup ring to form two ends within the backup ring, the cut permitting the backup ring to be contracted in diameter for seating of the backup ring in the annular groove, the cut defining respective shapes in the two ends of the backup ring that engage each other for latching the backup ring in a contracted diameter configuration, and at least one of the two ends having a cavity for receiving a tool for applying force to move the two ends apart and unlatch the backup ring from the contracted diameter configuration and expand the diameter of the backup ring for removal of the sealing ring from the annular groove.

In a second example, there is disclosed a backup ring according to the preceding first example, wherein the backup ring can be contracted and latched in the contracted diameter configuration, and then expanded and unlatched using the tool, any number of times.

In a third example, there is disclosed a backup ring according to any of the preceding examples first to second, wherein the backup ring is self-biased to expand from a minimum contracted diameter in an absence of force applied to the backup ring.

In a fourth example, there is disclosed a backup ring according to any of the preceding examples first to third, wherein the respective shape in a first one of the two ends includes a head, a neck narrower than the head, and shoulders extending from the neck and forming a V-shaped body, and the respective shape in a second one of the two ends is complementary to the respective shape in a first one of the two ends.

In a fifth example, there is disclosed a backup ring according to any of the preceding examples first to fourth, wherein the second one of the two ends has the cavity and the cavity extends into the backup ring in a radial direction to the head to permit the tool to contact and apply force to the head to move the two ends apart and unlatch the backup ring from the contracted diameter configuration and expand the diameter of the backup ring for removal of the sealing ring from the annular groove.

In a sixth example, there is disclosed a backup ring according to any of the preceding examples first to fifth, wherein the backup ring has a concave annular surface for contacting the sealing ring.

In a seventh example, there is disclosed a backup ring according to the preceding sixth example, wherein the cut is parallel to an axis of the backup ring.

In an eighth example, there is disclosed a backup ring according to the preceding sixth or seventh example, wherein the backup ring has an annular seating surface overhanging the concave annular surface.

In a ninth example, there is disclosed a backup ring according to any of the preceding examples sixth to eight, wherein the backup ring has an inner circumferential surface and an inner radial seating area on the inner circumferential surface away from concave annular surface.

In a tenth example, there is disclosed a backup ring according to any of the preceding examples sixth to ninth, wherein the backup ring has an outer circumferential surface and an annular ramp on the outer circumferential surface away from the concave annular surface, and the outer circumferential surface has an outer annular peripheral seating surface next to the annular ramp on the outer circumferential surface.

In an eleventh example, there is disclosed a backup ring according to any of the preceding examples first to tenth, wherein the backup ring has an outer periphery including an inclined annular groove and an outer circumferential seating surface overhanging the inclined annular groove.

In a twelfth example, there is disclosed a backup ring according to any of the preceding examples first to eleventh, wherein the backup ring has a concave annular surface for contacting the sealing ring, and the backup ring has an outer circumferential surface and an annular ramp on the outer circumferential surface away from the concave annular surface, and the outer circumferential surface has a first outer annular peripheral seating surface next to the annular ramp on the outer circumferential surface, and the backup ring has an outer periphery including an inclined annular groove and a second outer circumferential seating surface overhanging the inclined annular groove, and the backup ring has a third outer circumferential seating surface overhanging the concave annular surface.

In a thirteenth example, there is disclosed a backup ring according to any of the preceding examples first to twelfth, wherein the backup ring has a coating on a seating surface to prevent scratching of the sealing surface and promote sealing of the seating surface.

In a fourteenth example, there is disclosed a backup ring according to any of the preceding examples first to thirteenth, wherein the backup ring has a mounting surface and the backup ring has a coating for thermal isolation on the mounting surface.

In a fifteenth example, there is disclosed a backup ring according to any of the preceding examples first to fourteenth, wherein the backup ring has a mounting surface and the backup ring has a coating for thermal conduction on the mounting surface.

In a sixteenth example, there is disclosed a method of replacing a sealing ring seated in an annular groove next to a backup ring, the backup ring being split by a cut permitting the backup ring to be contracted in diameter for seating of the backup ring and the sealing ring in the annular groove, the cut defining respective shapes in two ends of the backup ring that engage each other for latching the backup ring in a contracted diameter configuration, and at least one of the two ends has a cavity for receiving a tool for applying force to move the two ends apart and unlatch the backup ring from the contracted diameter configuration and expand the backup ring for removal of the sealing ring from the annular groove. The method includes using the tool to expand the backup ring to permit removal of the sealing ring from the annular groove, removing the sealing ring from the annular groove and replacing the sealing ring with a replacement sealing ring, and contracting the backup ring in diameter so that the backup ring becomes latched in the contracted diameter configuration and the backup ring and the replacement sealing ring become seated in the annular groove.

In a seventeenth example, there is disclosed a method according to the preceding sixteenth example, wherein the tool is used to expand the backup ring to permit removal of the sealing ring from the annular groove by inserting a first end of the tool in a radial direction into a cavity in one of the two ends backup ring, and then moving a second end of the tool in a circumferential direction to expand the backup ring in diameter.

In an eighteenth example, there is disclosed a method according to the preceding seventeenth example, wherein the movement of the second end of the tool in the circumferential direction causes the first end of the tool to press against the other of the two ends of the backup ring to expand the backup ring in diameter.

In a nineteenth example, there is disclosed a resilient backup ring shaped for insertion with a sealing ring into an annular groove disposed in at least one of two close fitting members, the backup ring comprising a cut splitting the backup ring to form two ends within the backup ring, the cut permitting the backup ring to be contracted in diameter for seating of the backup ring in the annular groove, the cut defining respective shapes in the two ends of the backup ring that engage each other for latching the backup ring in a contracted diameter configuration, wherein the respective shape in a first one of the two ends includes a head, a neck narrower than the head, and shoulders extending from the neck and forming a V-shaped body, and the respective shape in a second one of the two ends is complementary to the respective shape in a first one of the two ends.

In a twentieth example, there is disclosed a backup ring according to the preceding nineteenth example, wherein the backup ring has an outer periphery including an inclined annular groove and an outer circumferential seating surface overhanging the inclined annular groove.

In a twenty-first example, there is disclosed a resilient backup ring shaped for insertion with a sealing ring into an annular groove disposed in at least one of two close fitting members, the backup ring comprising a cut splitting the backup ring to form two ends within the backup ring, the cut permitting the backup ring to be contracted in diameter for seating of the backup ring in the annular groove, wherein the backup ring has an outer periphery including an inclined annular groove and an outer circumferential seating surface overhanging the inclined annular groove.

In a twenty-second example, there is disclosed a backup ring according to any of the preceding examples nineteenth to twenty-first, wherein the backup ring has a concave annular surface for contacting the sealing ring.

In a twenty-third example, there is disclosed a backup ring according to any of the preceding examples nineteenth to twenty-second, wherein the cut is parallel to an axis of the backup ring.

In a twenty-fourth example, there is disclosed a backup ring according to any of the preceding examples nineteenth to twenty-third, wherein the backup ring has an annular seating surface overhanging the concave annular surface.

In a twenty-fifth example, there is disclosed a backup ring according to any of the preceding examples nineteenth to twenty-fourth, wherein the backup ring has an inner circumferential surface and an annular ramp on the inner circumferential surface away from concave annular surface.

In a twenty-sixth example, there is disclosed a backup ring according to any of the preceding examples nineteenth to twenty-fifth, wherein the backup ring has an outer circumferential surface and an annular ramp on the outer circumferential surface away from the concave annular surface, and the outer circumferential surface has an outer annular peripheral seating surface next to the annular ramp on the outer circumferential surface.

In a twenty-seventh example, there is disclosed a resilient backup ring shaped for insertion with a sealing ring into an annular groove disposed in at least one of two close fitting members, the backup ring comprising a cut splitting the backup ring to form two ends within the backup ring, the cut permitting the backup ring to be contracted in diameter for seating of the backup ring in the annular groove, wherein the backup ring has a concave annular surface for contacting the sealing ring, and the backup ring has an outer circumferential surface and an annular ramp on the outer circumferential surface away from the concave annular surface, and the outer circumferential surface has a first outer annular peripheral seating surface next to the annular ramp on the outer circumferential surface, and the backup ring has an outer periphery including an inclined annular groove and a second outer circumferential seating surface overhanging the inclined annular groove, and the backup ring has a third outer circumferential seating surface overhanging the concave annular surface.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A resilient backup ring shaped for insertion with a sealing ring into an annular groove disposed in at least one of two close fitting members, the backup ring comprising:
   a cut splitting the backup ring to form two ends within the backup ring, the cut permitting the backup ring to be contracted in diameter for seating of the backup ring in the annular groove, the cut defining respective shapes in the two ends of the backup ring that engage each other for latching the backup ring in a contracted diameter configuration, and
   at least one of the two ends having a cavity for receiving a tool for applying force to move the two ends apart and unlatch the backup ring from the contracted diameter configuration and expand the diameter of the backup ring for removal of the sealing ring from the annular groove.

2. The backup ring as claimed in claim 1, wherein the backup ring can be contracted and latched in the contracted diameter configuration, and then expanded and unlatched using the tool.

3. The backup ring as claimed in claim 1, wherein the backup ring is self-biased to expand from a minimum contracted diameter in an absence of force applied to the backup ring.

4. The backup ring as claimed in claim 1, wherein the respective shape in a first one of the two ends includes a head, a neck narrower than the head, and shoulders extending from the neck and forming a V-shaped body, and the respective shape in a second one of the two ends is complementary to the respective shape in the first one of the two ends.

5. The backup ring as claimed in claim 4, wherein the second one of the two ends has the cavity and the cavity extends into the backup ring in a radial direction to the head to permit the tool to contact and apply force to the head to move the two ends apart and unlatch the backup ring from the contracted diameter configuration and expand the diameter of the backup ring for removal of the sealing ring from the annular groove.

6. The backup ring as claimed in claim 1, wherein the backup ring has a concave annular surface for contacting the sealing ring.

7. The backup ring as claimed in claim 6, wherein the cut is parallel to an axis of the backup ring.

8. The backup ring as claimed in claim 6, wherein the backup ring has an annular seating surface overhanging the concave annular surface.

9. The backup ring as claimed in claim 6, wherein the backup ring has an inner circumferential surface and an inner radial seating area on the inner circumferential surface away from the concave annular surface.

10. The backup ring as claimed in claim 6, wherein the backup ring has an outer circumferential surface and an annular ramp on the outer circumferential surface away from the concave annular surface, and the outer circumferential surface has an outer annular peripheral seating surface next to the annular ramp on the outer circumferential surface.

11. The backup ring as claimed in claim 1, wherein the backup ring has an outer periphery including an inclined annular groove and an outer circumferential seating surface overhanging the inclined annular groove.

12. The backup ring as claimed in claim 1, wherein the backup ring has a concave annular surface for contacting the sealing ring, and the backup ring has an outer circumferential surface and an annular ramp on the outer circumferential surface away from the concave annular surface, and the outer circumferential surface has a first outer annular peripheral seating surface next to the annular ramp on the outer circumferential surface, and the backup ring has an outer periphery including an inclined annular groove and a second outer circumferential seating surface overhanging the inclined annular groove, and the backup ring has a third outer circumferential seating surface overhanging the concave annular surface.

13. The backup ring as claimed in claim 1, wherein the backup ring has a coating on a seating surface to prevent scratching of the seating surface and promote seating of the seating surface.

14. The backup ring as claimed in claim 1, wherein the backup ring has a mounting surface and the backup ring has a coating for thermal isolation on the mounting surface.

15. The backup ring as claimed in claim 1, wherein the backup ring has a mounting surface and the backup ring has a coating for thermal conduction on the mounting surface.

16. A method of replacing a sealing ring seated in an annular groove next to a backup ring, the backup ring being split by a cut permitting the backup ring to be contracted in diameter for seating of the backup ring and the sealing ring in the annular groove, the cut defining respective shapes in two ends of the backup ring that engage each other for latching the backup ring in a contracted diameter configuration, and at least one of the two ends has a cavity for receiving a tool for applying force to move the two ends apart and unlatch the backup ring from the contracted diameter configuration and expand the backup ring for removal of the sealing ring from the annular groove, said method comprising:
 a) using the tool to expand the backup ring to permit removal of the sealing ring from the annular groove;
 b) removing the sealing ring from the annular groove and replacing the sealing ring with a replacement sealing ring; and
 c) contracting the backup ring in diameter so that the backup ring becomes latched in the contracted diameter configuration and the backup ring and the replacement sealing ring become seated in the annular groove.

17. The method as claimed in claim 16, wherein the tool is used to expand the backup ring to permit removal of the sealing ring from the annular groove by inserting a first end of the tool in a radial direction into the cavity in one of the two ends of the backup ring, and then moving a second end of the tool in a circumferential direction to expand the backup ring in diameter.

18. The method as claimed in claim 17, wherein the movement of the second end of the tool in the circumferential direction causes the first end of the tool to press against the other of the two ends of the backup ring to expand the backup ring in diameter.

\* \* \* \* \*